US010644390B2

(12) United States Patent
Janitch et al.

(10) Patent No.: US 10,644,390 B2
(45) Date of Patent: May 5, 2020

(54) THROUGH AIR RADAR LEVEL TRANSMITTER WITH RADIO FREQUENCY SHIELDING

(71) Applicant: Magnetrol International, Incorporated, Aurora, IL (US)

(72) Inventors: Paul G. Janitch, Lisle, IL (US); Feng Tang, Geneva, IL (US)

(73) Assignee: Magnetrol International, Incorporated, Aurora, IL (US)

( * ) Notice: Subject to any disclaimer, the term of this patent is extended or adjusted under 35 U.S.C. 154(b) by 319 days.

(21) Appl. No.: 15/676,277

(22) Filed: Aug. 14, 2017

(65) Prior Publication Data

US 2018/0212316 A1    Jul. 26, 2018

Related U.S. Application Data

(60) Provisional application No. 62/449,663, filed on Jan. 24, 2017.

(51) Int. Cl.
| | |
|---|---|
| *H01Q 1/42* | (2006.01) |
| *G01F 23/284* | (2006.01) |
| *G01S 7/28* | (2006.01) |
| *H01Q 1/52* | (2006.01) |
| *H01Q 3/08* | (2006.01) |

(Continued)

(52) U.S. Cl.
CPC .............. *H01Q 1/42* (2013.01); *G01F 23/284* (2013.01); *G01S 7/02* (2013.01); *G01S 7/28* (2013.01); *G01S 13/10* (2013.01); *G01S 13/88* (2013.01); *G08C 19/02* (2013.01); *H01Q 1/526* (2013.01); *H01Q 3/08* (2013.01); *H01Q 13/02* (2013.01); *H01Q 21/0006* (2013.01); *G01S 2007/027* (2013.01)

(58) Field of Classification Search
CPC combination set(s) only.
See application file for complete search history.

(56) References Cited

U.S. PATENT DOCUMENTS

| 6,206,582 B1 | 3/2001 | Gilliland |
| 8,686,910 B1 | 4/2014 | Ives et al. |

(Continued)

FOREIGN PATENT DOCUMENTS

EP    2519086 B1    3/2016

OTHER PUBLICATIONS

International Search Report and Written Opinion for corresponding PCT Application No. PCT/US2018/014427 dated Apr. 6, 2018.

*Primary Examiner* — Mamadou L Diallo
(74) *Attorney, Agent, or Firm* — Wood, Phillips, Katz, Clark & Mortimer

(57) ABSTRACT

A through air measurement instrument comprises a housing for mounting to a process vessel and including a waveguide. A control circuit in the housing controls operation of the instrument for determining level. An RF circuit board in the housing is operatively controlled by the control circuit and includes a microwave transceiver circuit connected via a coupler to strip line traces on the printed circuit board for coupling a high frequency radar signal with the waveguide for measuring level. A multi-function RF shield comprises a cover for the RF circuit board. The cover includes a metallic covering on an inside surface for capping the waveguide and providing an RF shield.

16 Claims, 6 Drawing Sheets

(51) Int. Cl.
*G01S 13/88* (2006.01)
*G01S 13/10* (2006.01)
*G01S 7/02* (2006.01)
*H01Q 21/00* (2006.01)
*G08C 19/02* (2006.01)
*H01Q 13/02* (2006.01)

(56) References Cited

U.S. PATENT DOCUMENTS

| | | | |
|---|---|---|---|
| 2001/0050629 A1* | 12/2001 | Benway | G01F 23/284 342/124 |
| 2004/0066348 A1* | 4/2004 | Janitch | G01F 23/284 343/785 |
| 2004/0066588 A1 | 4/2004 | Flasza et al. | |
| 2010/0060512 A1 | 3/2010 | Garrod et al. | |
| 2010/0188296 A1 | 7/2010 | Gard | |

\* cited by examiner

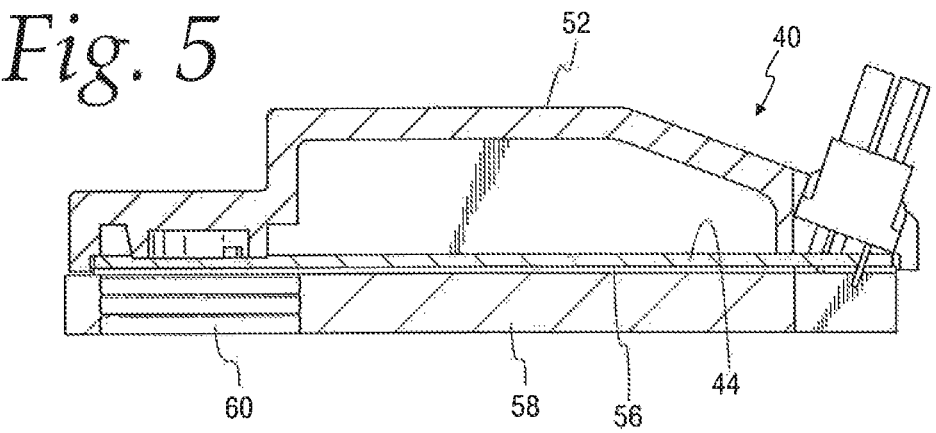
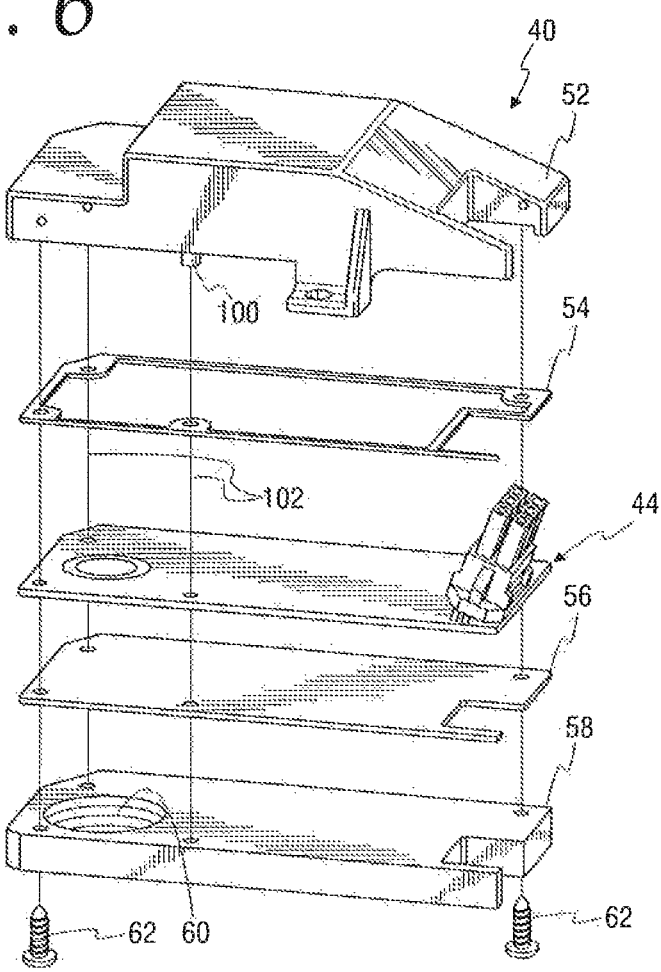

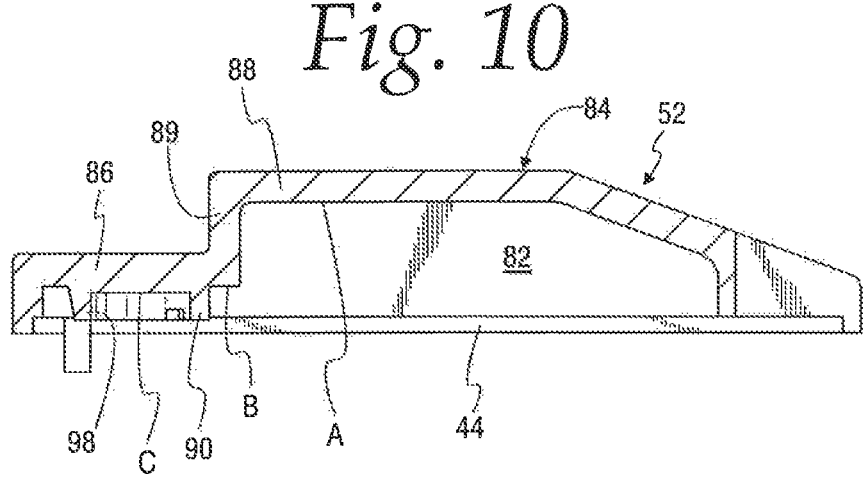
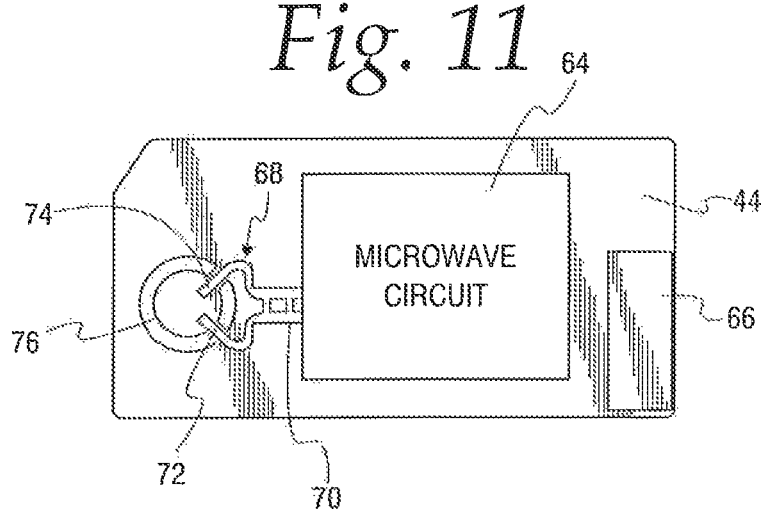

THROUGH AIR RADAR LEVEL TRANSMITTER WITH RADIO FREQUENCY SHIELDING

CROSS-REFERENCE TO RELATED APPLICATIONS

This application claims priority of provisional application No. 62/449,663, filed Jan. 24, 2017.

FEDERALLY SPONSORED RESEARCH OR DEVELOPMENT

Not Applicable.

MICROFICHE/COPYRIGHT REFERENCE

Not Applicable.

FIELD

This invention relates to process control instruments and, more particularly, to a measurement instrument with radio frequency shielding.

BACKGROUND

Process control systems require the accurate measurement of process variables. Typically, a sensor in the form of a primary element senses the value of a process variable and a transmitter develops an output having a value that varies as a function of the process variable. For example, a level transmitter includes a primary element for sensing level and a circuit for developing an electrical signal representing sensed level.

Knowledge of level in industrial process tanks or vessels has long been required for safe and cost-effective operation of plants. Many technologies exist for making level measurements. These include buoyancy, capacitance, ultrasonic and microwave radar, to name a few.

In one form, a through air measurement instrument, such as a microwave radar level transmitter, launches a radar signal which reflects off a liquid or other surface and the instrument measures time of flight between transmission and reception of the radar signal. Electrical energy is converted to an electromagnetic wave from a launch element. The wave propagates through free space.

An electronic enclosure includes an RF circuit which may include the launch element on a printed circuit board. The launch element may be configured to use linear polarization or circular polarization. With circular polarization, the launching element creates radiation where the electric field rotates at increasing distances from the launching element. A magnetic wave is passed through a waveguide. The waveguide is specifically defined according to the operating frequency. With a high frequency signal such as in the K-3 band, which operates at about 26 GHz, the overall design of the waveguide is important and the waveguide must be enclosed at a near end to satisfy these requirements.

Moreover, with very high frequency radar signals it is necessary to avoid problems caused by RF signal leaking out and possible radiation loss from the launching element at the very high microwave frequencies. It is also necessary to reduce cross talk between adjacent traces forming the launching element.

The present invention is directed to solving one or more of the problems discussed above in a novel and simple manner.

SUMMARY

As described herein, a through air radar measurement instrument comprises a housing for mounting to a process vessel and including a waveguide. A control circuit in the housing controls operation of the instrument for determining level. A radio frequency (RF) circuit board in the housing is operatively controlled by the control circuit and includes a launching element operatively associated with the waveguide for generating or receiving a high frequency radar signal for measuring level. An RF shield comprises a cover for the RF circuit board. The cover includes a metallic covering on an inside surface for RF shielding.

In one aspect, it is a feature that the cover comprises a cylindrical wall extending inwardly from the cover and aligned with the waveguide and the metallic coating is on the cylindrical wall to define a waveguide cap.

In accordance with another aspect, it is a feature that the launching element comprises a pair of strip line traces extending from a microwave circuit and one section of the metallic covering overlies the strip line traces to comprise a top ground of the strip lines to reduce radiation loss from the strip lines and reduce cross talk between the traces. Another section of the metallic covering may overlie the microwave circuit to prevent RF signals from leaking out. It is another feature that spacing between the one section on the RF circuit board is less than spacing between the another section and the RF circuit board.

It is a further feature that the cover comprises a plurality of locating pins extending through openings in the RF circuit board to align the launching element with the waveguide.

It is yet another feature that the cover comprises a plastic part of a select thickness to ensure required spacing between circuit ground and case ground for intrinsic safety.

There is disclosed in accordance with another aspect a through air measurement instrument comprising a housing for mounting to a process vessel and including a waveguide. A control circuit in the housing controls operation of the instrument for determining level. An RF circuit board in the housing is operatively controlled by the control circuit and includes a microwave transceiver circuit connected via a coupler to strip line traces on the printed circuit board for coupling a high frequency radar signal with the waveguide for measuring level. A multi-function RF shield comprises a cover for the RF circuit board. The cover includes a metallic covering on an inside surface for capping the waveguide and providing an RF shield.

Other features and advantages will be apparent from a review of the entire specification, including the drawings and claims.

BRIEF DESCRIPTION OF THE DRAWINGS

FIG. 5 is a sectional view of the RF module;

FIG. 6 is an exploded view of the RF module;

FIG. 10 is a cross section of the RF shield;

FIG. 11 is a top plan view of a PC board of the RF module with a microwave transceiver circuit illustrated in block form.

DETAILED DESCRIPTION

Figure 1:
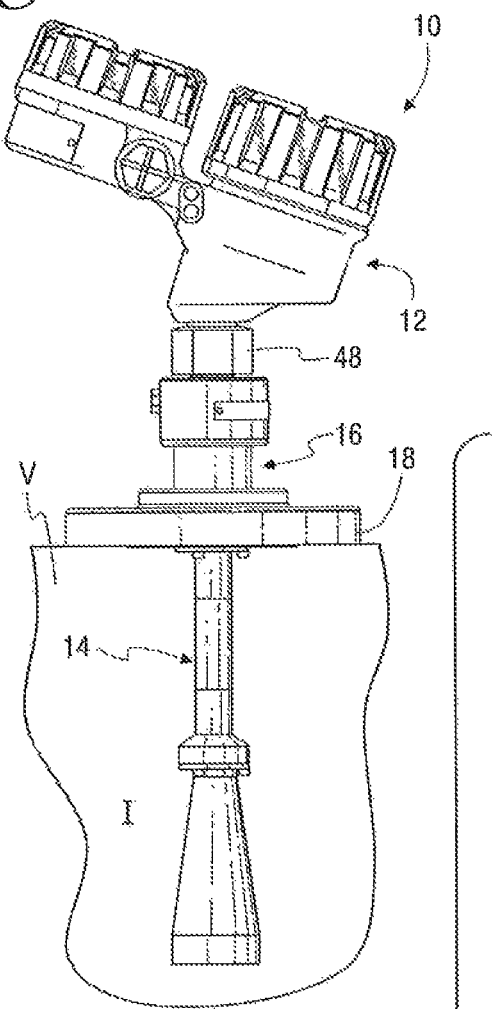
FIG. 1 is a side view of a through air measurement instrument including a radio frequency (RF) shield in accordance with the invention.
Figure 2:
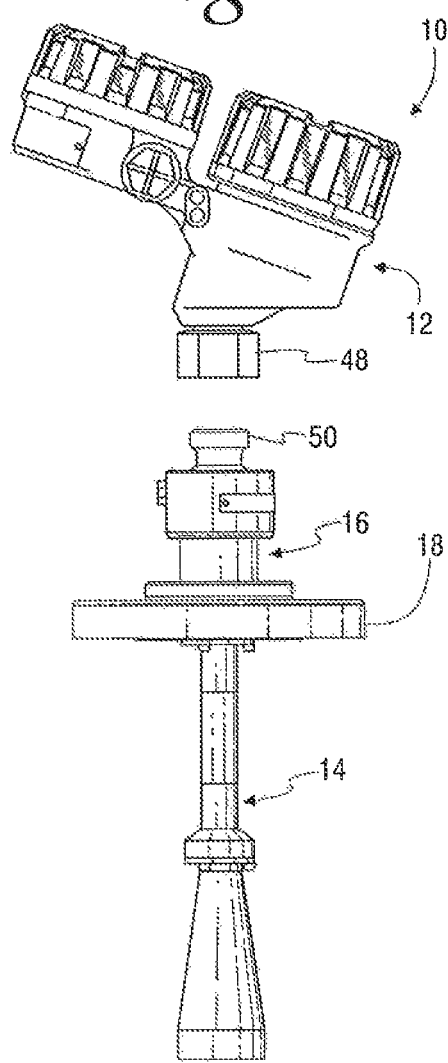
FIG. 2 is a side view, similar to FIG. 1, with a control housing separate from a primary element.

Referring to FIGS. 1 and 2, a process control instrument 10 according to the invention is illustrated. The process control instrument 10 uses micro power impulse radar (MIR) in conjunction with equivalent time sampling (ETS) and ultra-wideband (UWB) transceivers for measuring a level using time domain reflectometry (TDR). Particularly, the instrument 10 uses through air radar for sensing level. While the embodiments described herein relate to an MIR level sensing apparatus, various aspects of the invention may be used with other types of process control instruments for measuring various process parameters, such as a rangefinder, as will be apparent to those skilled in the art.

The process control instrument 10 includes a control housing 12 and a sensor or primary element 14. In the illustrated embodiment, the primary element 14 is an antenna.

The antenna 14 includes a process adapter 16 for connection to the housing 12. The process adapter 16 is mounted to a process vessel V, see FIG. 1, using a flange 18. The process adapter 16 may be threaded or welded to the flange 18. Alternatively, the process adapter 16 may be threaded directly into an opening in the process vessel V.

The instrument 10 uses pulse-burst radar technology with ETS circuitry. Short bursts of microwave energy are emitted and subsequently reflected from a surface. The distance is calculated by the equation.

$$D = (\text{velocity of EM propagation}) * \text{transit time (round trip)}/2.$$

Level is then calculated by applying a tank height value. ETS is used to measure the high speed, low power electromagnetic (EM) energy. The high-speed EM energy (1,000 ft/μs) is difficult to measure over short distances and at the resolutions required in the process control industry. ETS captures the EM signals in real time (nanoseconds) and reconstructs them in equivalent time (milliseconds), which is much easier to measure. ETS is accomplished by scanning the vessel to collect thousands of samples. The round-trip event on a 65 ft. tank takes only 133 nanoseconds in real time. After it is reconstructed in equivalent time it measures 200 milliseconds.

The through air radar level measurement instrument 10 launches a radar signal which reflects off a liquid or other surface and measures time of flight between transmission and reception of the radar signal. Electrical energy is converted to an electromagnetic wave from the launching element which propagates through free space. The system operates a signal around 26 GHz.

Figure 3:
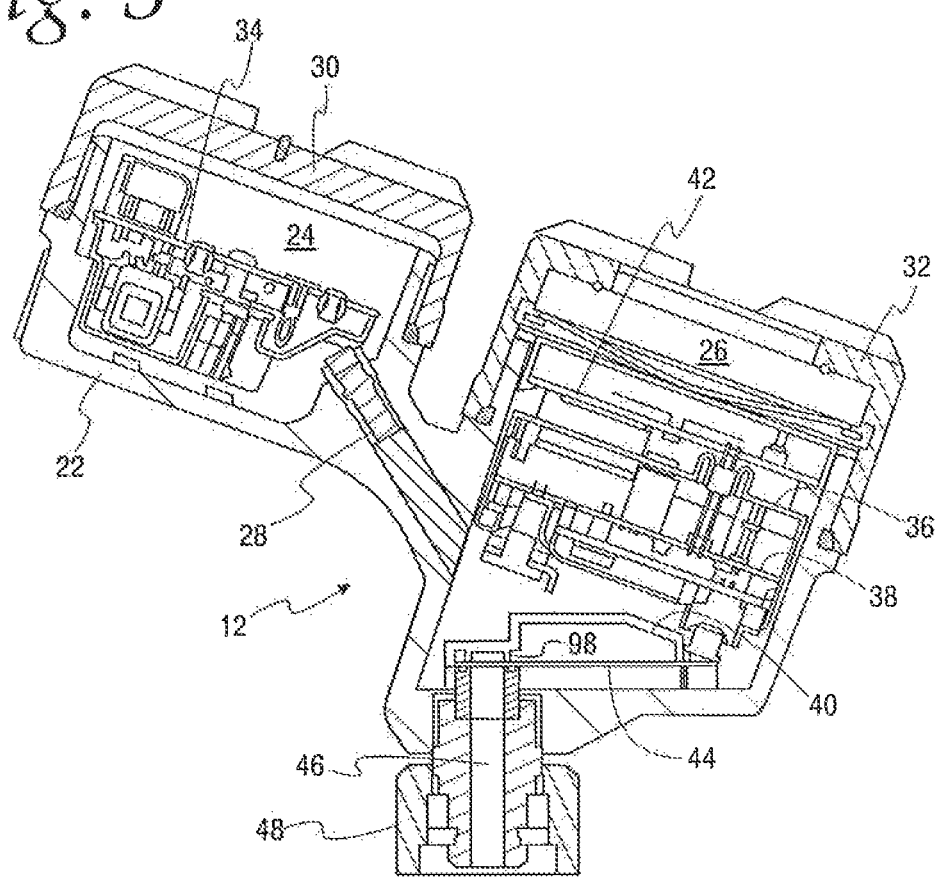
FIG. 3 is a side section view of the control housing.

Referring to FIG. 3, the control housing 12 comprises a dual compartment housing including a base 22 defining an explosion proof compartment 24 and an intrinsically safe compartment 26 connected via a passage 28. A first cover 30 encloses the explosion proof compartment 24. A second cover 32 encloses the intrinsically safe compartment 26. The explosion proof compartment 24 houses a wiring board 34 for connecting to a remote power source and including necessary interface circuitry. This circuitry is in communication with a digital PC board 36 and an analog PC board 38 in the intrinsically safe compartment 26. The digital PC board includes a microprocessor for controlling functionality of the overall instrument. The analog PC board 38 drives a radio frequency (RF) module 40 and further processes the return signal from the RF module 40. The RF module 40 is in communication with the antenna 14, as described below. A display/keypad PC board 42 is connected to the digital PC board 36 and is viewable through and accessible upon removal of the second cover 32.

The form of the housing 12 and the circuits therein are illustrated and described by way of example only. The invention is particularly directed to RF shielding, as described below.

The RF module 40 has a printed circuit board 44 with a launching element, described below. In the illustrated embodiment, the launching element comprises electro-magnetic radiating elements which are conductive traces designed on the circuit board 44. The launching element generates and receives a high frequency signal for measuring level.

An air-filled antenna waveguide 46 is sealingly mounted to the control housing 12 and aligned with the launching element on the printed circuit board 44. Thus, the launching element works together with the waveguide 46 and a waveguide cap 98, discussed below, to generate the launching signal to the antenna 14, as is known. The air-filled waveguide is adapted to operate in the K-3 band.

The antenna waveguide 46 is surrounded by a quick connect coupler 48 for mating with a corresponding quick connect coupler 50 on the antenna 14, see FIG. 2. This provides a quick connect/disconnect coupling that allows the vessel V to remain sealed upon removal of the control housing 12.

Figure 4:
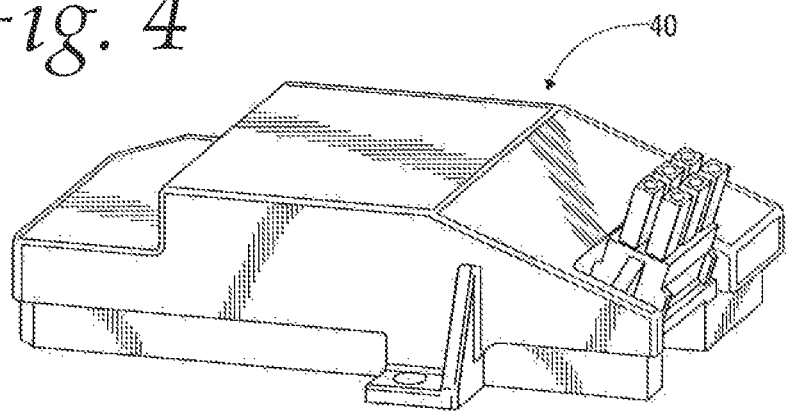
FIG. 4 is a perspective view of an RF module from the control housing.
Figure 7:
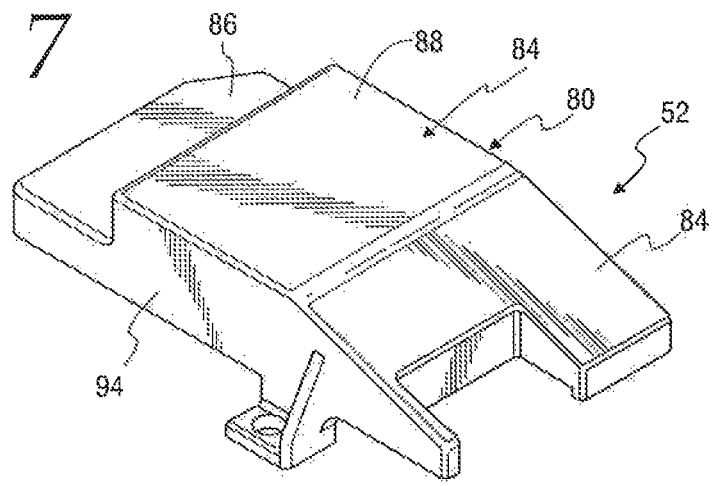
FIG. 7 is a top perspective view of an RF shield of the RF module.
Figure 8:
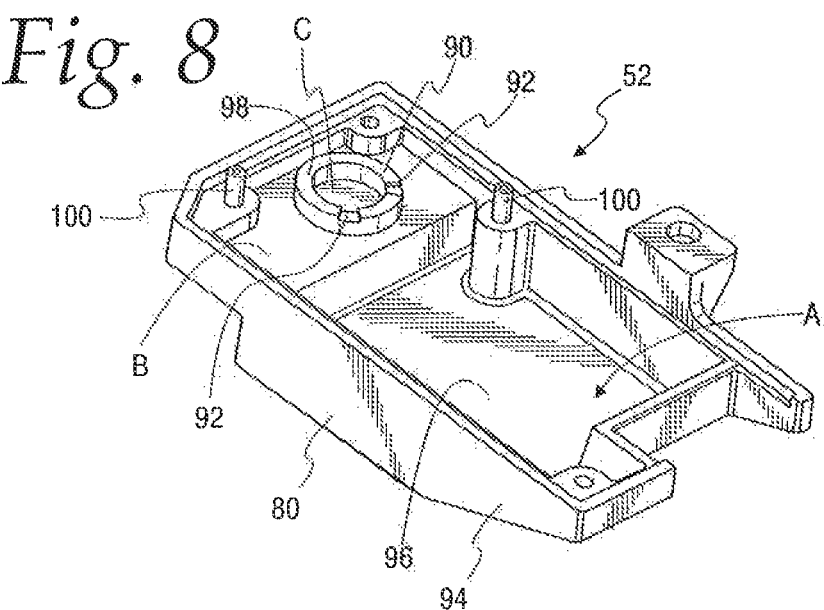
FIG. 8 is a bottom perspective view of the RF shield.
Figure 9:
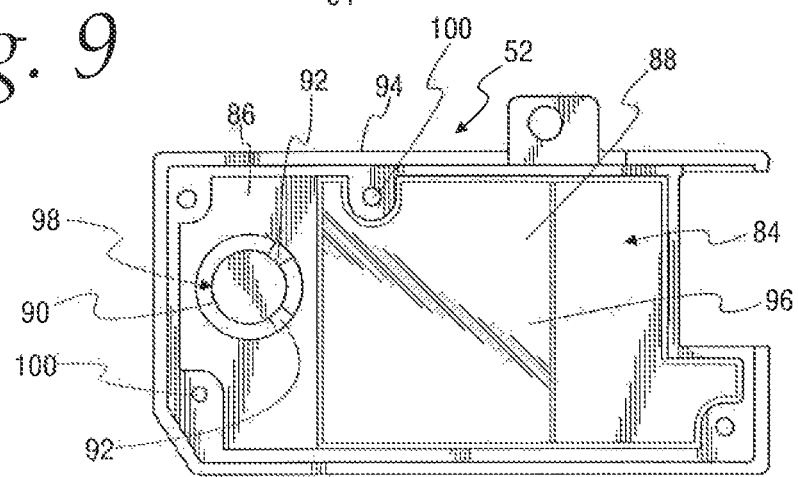
FIG. 9 is a bottom plan view of the RF shield.

Referring to FIGS. 4-6, the RF module 40 includes an RF shield 52, an adhesive gasket 54, the RF PC board 44, a PTFE insulation layer 56 and a module base plate 58. The base plate 58 is formed of a rigid plastic and includes an opening 60 which is threaded for receiving a threaded upper end of the waveguide 46. The insulation layer 56 is disposed between the PC board 44 and the base plate 58. The adhesive gasket 54 extends around the periphery of the PC board to provide a seal between the PC board 44 and the RF shield 52. The RF module 40 is secured together by fasteners 62 through suitable openings in the various components, as shown. As will be apparent, the circuit elements are omitted from the PC board 44 in FIG. 6 for clarity.

Referring also to FIG. 11, the RF PC board 44 includes a microwave transceiver circuit 64 illustrated in block form, as the specific components of the circuit are not necessary for an understanding of the invention described and claimed herein. The RF PC board 44 includes a connector 66 to provide suitable electric connections between the microwave circuit 64 and the analog PC board 38, see FIG. 3. The microwave circuit 64 controls a launch element 68 on the PC board 44. Particularly, the microwave circuit 64 is connected using a coupler 70 to first and second radiating elements formed by respective strip line traces 72 and 74 for coupling a high frequency radar signal with the waveguide 46. The described launching element 68 provides two signals shifted ninety degrees into an orthogonal feed to provide circular polarization into the waveguide 46. The traces 72 and 74 extend into a broken circular trace 76 which is electrically connected to a PC board ground (not shown).

Generally, although not shown, the transceiver circuit 64 may comprise a microwave generator circuit connected to one leg of the coupler 70 and receive circuitry connected to another leg of the coupler 70. Necessary filter circuits may also be included. The launching element 68 includes dual orthogonal field elements with signals spaced 90° apart due to the coupler 70. This creates an electromagnetic wave having circular polarization.

Referring to FIGS. 7-10, the RF shield 52 comprises a multi-function RF shield designed for the level probing radar at the very high microwave frequency of the K-3 band. The shield 52 comprises a cover 80 of molded plastic to define an interior space 82 defined by a top wall 84. The top wall 84 includes a planar launching element section 86 at one end which is offset from a circuit covering section 88 by a vertical wall 89. The circuit covering section 88 is generally planar but is turned downward at a distal end. A cylindrical wall 90 extends inwardly from the launching element section 86 and is positioned to directly overlie the broken circular trace 76 on the PC board 44, and the base plate opening 60. The cylindrical wall 90 is of a size corresponding to requirements for the waveguide 46. The cylindrical wall 90 includes distal notches 92 angularly spaced corresponding to broken areas of the circular trace 76 where the strip line traces 72 and 74 pass through. A peripheral side wall 94 surrounds the top wall 84.

The RF shield 52 is a molded plastic part of 1.5 mm minimum plastic thickness. The thickness of the plastic ensures that the required spacing between circuit ground and case ground is maintained for intrinsic safety considerations. The underside of the RF shield 52 has a continuous metalized surface 96, such as with an aluminum layer. This surface 96 includes the inside surfaces of the top wall 84, the cylinder 90 and the peripheral wall 94.

The RF shield 52 defines three functional shield areas. Shield area A is used to shield RF signal from leaking out from the microwave circuit 64, see FIG. 11. Shield area B is used to shield RF signal and is used as the top ground of the strip line above the strip line traces 72 and 74, that is used to reduce the radiation loss from the launch element 68 at the very high microwave frequency and reduces cross talk between the long adjacent traces 72 and 74. Shield area C is defined by the cylinder 90 which, together with the enclosed end formed by the top wall section 86, provides a waveguide cap 98. The signal radiated from the microwave strips of the launching element 68 on the RF PC board 44 is guided to the waveguide 46 and then to the antenna.

All three of the shield areas A, B and C are in electrical contact with one another relative to low frequencies. With respect to the 26 GHz RF frequency, the waveguide cap area C, is isolated from the other areas A and B.

As described above, the broken circular trace 76 is part of the circuit ground. The distal edge of the cylindrical wall 90, with the metallic surface, is in electrical contact with the circular trace 76. The distance from the top wall of the waveguide cap 98, see FIG. 10, to the RF PC board 44 is around 0.091" to 0.093", which is less than a quarter wave length. The spacing of the second shield area B to the PC board 44 is about 0.097". The normal shield height of the first shield area A from the RF PC board 44 is about 0.357", which is approximately three-quarter wave length.

The RF shield 52 also includes a pair of locator pins 100 aligned, as indicated by lines 102, with other components of the RF module 40 to accurately position the shield waveguide cap 98 relative to the launching element 68 and the waveguide 46.

Figure 12:
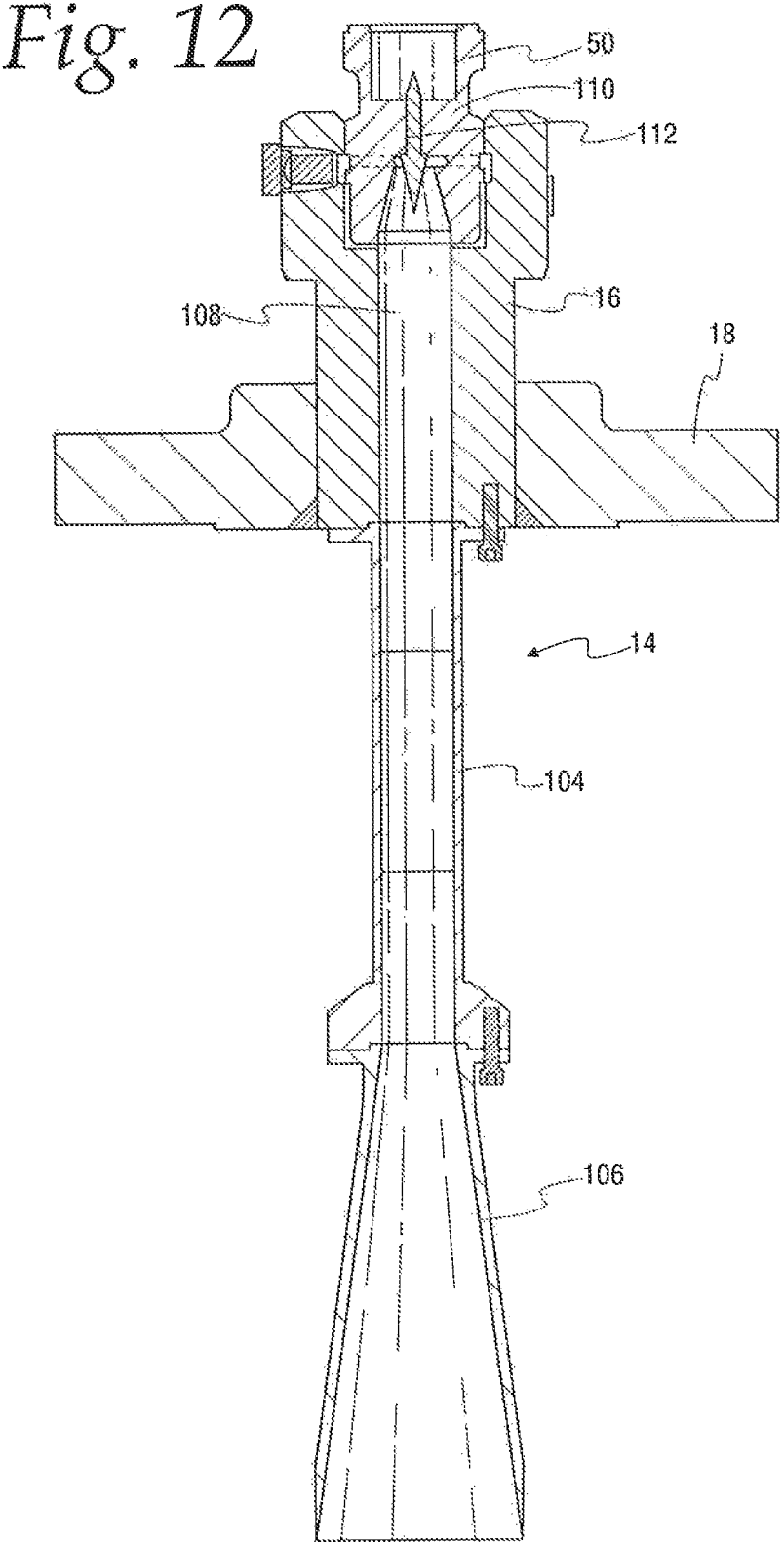
FIG. 12 is a sectional view of the primary element.

Referring to FIG. 12, the antenna 14 comprises a horn extension 104 mounted to the process adapter 16 at one end and an opposite end connected to an antenna horn 106. The process adapter 16 has a through opening 108 that with the horn extension 104 and antenna horn 106 provide a continuous hollow space open to an interior I of the process vessel V, see FIG. 1, in use. The process adaptor 16 houses a seal adapter 110 including a seal 112. The seal 112 provides a process seal and a transition from the waveguide 46 to the antenna 14.

With the described construction, the microwave transceiver circuit 64 generates an electrical signal which is converted to an electromagnetic radar wave by the launching element 68 which launches a radar signal through the waveguide 46 and the antenna 14. The radar signal reflects off a liquid or other surface and the reflected electromagnetic radar wave is captured by the launching element 68 and converted to an electrical signal by the transceiver circuit 64 and passed to the analog PC board 38 for further processing, as is conventional. The invention herein is particularly directed to the RF shield 52 and the shielding functionality provided thereby. As will be appreciated the details of the RF shield 52 may vary as necessary for a structural considerations and frequency, and the shield may have more or less than the described three shield areas A, B and C, as necessary or desired.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The foregoing disclosure of specific embodiments is intended to be illustrative of the broad concepts comprehended by the invention.

The invention claimed is:

1. A through air radar measurement instrument comprising:
   a housing for mounting to a process vessel and including a waveguide;
   a control circuit in the housing controlling operation of the instrument for determining level;
   a radio frequency (RF) circuit board in the housing operatively controlled by the control circuit and including a launching element operatively associated with the waveguide for generating or receiving a high frequency radar signal for measuring level; and
   an RF shield comprising a cover for the RF circuit board, the cover including a metallic covering on an inside surface for RF shielding.

2. The through air radar measurement instrument of claim 1 wherein the cover comprises a cylindrical wall extending inwardly from the cover and aligned with the waveguide and the metallic covering is on the cylindrical wall to define a waveguide cap.

3. The through air radar measurement instrument of claim 1 wherein the launching element comprises a pair of strip line traces extending from a microwave circuit and one section of the metallic covering overlies the strip line traces to comprise a top ground of the strip lines to reduce radiation loss from the strip lines and reduce cross talk between the traces.

4. The through air radar measurement instrument of claim 3 wherein another section of the metallic covering overlies the microwave circuit to prevent RF signals from leaking out.

5. The through air radar measurement instrument of claim 4 wherein spacing between the one section and the RF circuit board is less than spacing between the another section and the RF circuit board.

6. The through air radar measurement instrument of claim 1 wherein the cover comprises a plurality of locating pins extending through openings in the RF circuit board to align the launching element with the waveguide.

7. The through air radar measurement instrument of claim 1 wherein the cover comprises a plastic part of a select thickness to ensure required spacing between circuit ground and case ground for intrinsic safety.

8. A through air measurement instrument comprising:
a housing for mounting to a process vessel and including a waveguide;
a control circuit in the housing controlling operation of the instrument for determining level;
a radio frequency (RF) circuit board in the housing operatively controlled by the control circuit and including a microwave transceiver circuit connected via a coupler to strip line traces on the printed circuit board for coupling a high frequency radar signal with the waveguide for measuring level; and
a multifunction RF shield comprising a cover for the RF circuit board, the cover including a metallic covering on an inside surface for capping the waveguide and providing an RF shield.

9. The through air radar measurement instrument of claim 8 wherein the cover comprises a cylindrical wall extending inwardly from the cover and aligned with the waveguide and the metallic covering is on the cylindrical wall to define a waveguide cap.

10. The through air radar measurement instrument of claim 8 wherein one section of the metallic covering overlies the strip line traces to comprise a top ground of the strip lines to reduce radiation loss from the strip lines and reduce cross talk between adjacent traces.

11. The through air radar measurement instrument of claim 10 wherein another section of the metallic covering overlies the microwave circuit to prevent RF signals from leaking out.

12. The through air radar measurement instrument of claim 11 wherein spacing between the one section and the RF circuit board is less than spacing between the another section and the RF circuit board.

13. The through air radar measurement instrument of claim 8 wherein the cover comprises a plurality of locating pins extending through openings in the RF circuit board to align the launching element with the waveguide.

14. The through air radar measurement instrument of claim 8 wherein the cover comprises a plastic part of a select thickness to ensure required spacing between circuit ground and case ground for intrinsic safety.

15. The through air radar measurement instrument of claim 8 wherein the RF shield comprises a first section to shield RF signals from leaking, a second section comprise a top ground of the strip lines to reduce radiation loss from the strip lines and reduce cross talk between adjacent traces and a third section comprising a waveguide cap.

16. The through air radar measurement instrument of claim 15 wherein spacing between the circuit board and each of the three sections is different.

* * * * *